United States Patent
Zivkovic et al.

(10) Patent No.: US 10,210,242 B1
(45) Date of Patent: Feb. 19, 2019

(54) PRESENTING FORKED AUTO-COMPLETIONS

(71) Applicant: Google LLC, Mountain View, CA (US)

(72) Inventors: Dragan Zivkovic, Sunnyvale, CA (US); Hidetoshi Tajima, San Jose, CA (US); Peter Jin Hong, San Francisco, CA (US)

(73) Assignee: Google LLC, Mountain View, CA (US)

( * ) Notice: Subject to any disclaimer, the term of this patent is extended or adjusted under 35 U.S.C. 154(b) by 264 days.

(21) Appl. No.: 15/088,306

(22) Filed: Apr. 1, 2016

Related U.S. Application Data (63) Continuation of application No. 13/426,163, filed on Mar. 21, 2012, now Pat. No. 9,317,605.

(51) Int. Cl.
  *G06F 7/00* (2006.01)
  *G06F 17/30* (2006.01)

(52) U.S. Cl.
  CPC .... *G06F 17/3064* (2013.01); *G06F 17/30864* (2013.01)

(58) Field of Classification Search
  CPC ......... G06F 17/30864; G06F 17/30663; G06F 17/30719; G06F 17/30705; G06F 17/277; G06F 17/30616; G06F 17/30646; G06F 17/30684; G06F 17/30867
  See application file for complete search history.

(56) References Cited

U.S. PATENT DOCUMENTS

| | | | |
|---|---|---|---|
| 5,027,406 A | 6/1991 | Roberts et al. | |
| 5,712,957 A | 1/1998 | Waibel et al. | |
| 5,797,123 A | 8/1998 | Chou et al. | |
| 5,895,456 A | 4/1999 | Goldberg et al. | |
| 6,006,225 A * | 12/1999 | Bowman | G06F 17/30395 |
| 6,021,384 A | 2/2000 | Goren et al. | |
| 6,064,959 A | 5/2000 | Young et al. | |
| 6,453,292 B2 | 9/2002 | Ramaswamy et al. | |
| 6,513,006 B2 | 1/2003 | Howard et al. | |
| 6,556,970 B1 | 4/2003 | Sasaki et al. | |
| 6,587,824 B1 | 7/2003 | Everhart et al. | |

(Continued)

FOREIGN PATENT DOCUMENTS

| | | |
|---|---|---|
| EP | 1 300 828 | 4/2003 |
| JP | 2000-076040 | 3/2000 |

(Continued)

OTHER PUBLICATIONS

"Correlation Coefficient," http://mathbits.com/MathBits/TISection/Statistics2/correlation.htm, accessed Jul. 8, 2013, 3 pages.

(Continued)

*Primary Examiner* — Hasanul Mobin
(74) *Attorney, Agent, or Firm* — Fish & Richardson P.C.

(57) ABSTRACT

Methods, systems, and apparatus, including computer programs encoded on a computer storage medium, for presenting forked auto-completions. In one aspect, a method includes receiving characters from a user device, obtaining an auto-completion that corresponds to the received characters, obtaining corpora and respective corpus scores associated with the auto-completion, selecting corpora based on the corpus scores, and providing the user device with data identifying the auto-completion and the selected corpora.

20 Claims, 8 Drawing Sheets

(56) References Cited

U.S. PATENT DOCUMENTS

| | | |
|---|---|---|
| 6,615,172 B1 | 9/2003 | Bennett et al. |
| 6,629,066 B1 | 9/2003 | Jackson et al. |
| 6,633,235 B1 | 10/2003 | Hsu et al. |
| 6,643,620 B1 | 11/2003 | Contolini et al. |
| 6,795,808 B1 | 9/2004 | Strubbe et al. |
| 6,839,668 B2 | 1/2005 | Kuo et al. |
| 6,839,669 B1 | 1/2005 | Gould et al. |
| 6,879,956 B1 | 4/2005 | Honda et al. |
| 6,993,482 B2 | 1/2006 | Ahlenius |
| 7,020,609 B2 | 3/2006 | Thrift et al. |
| 7,315,818 B2 | 1/2008 | Stevens et al. |
| 7,450,698 B2 | 11/2008 | Bushey |
| 7,457,750 B2 | 11/2008 | Shostak |
| 7,555,431 B2 | 6/2009 | Bennett |
| 7,567,907 B2 | 7/2009 | Greene et al. |
| 7,599,838 B2 | 10/2009 | Gong et al. |
| 7,603,360 B2 | 10/2009 | Ramer et al. |
| 7,693,720 B2 | 4/2010 | Kennewick et al. |
| 7,729,920 B2 | 6/2010 | Char |
| 7,788,248 B2* | 8/2010 | Forstall ............. G06F 17/30864 707/706 |
| 7,840,579 B2 | 11/2010 | Samuelson et al. |
| 7,917,368 B2 | 3/2011 | Weinberg |
| 7,949,529 B2 | 5/2011 | Weider et al. |
| 8,027,974 B2 | 9/2011 | Gibbs |
| 8,065,148 B2 | 11/2011 | Huerta et al. |
| 8,069,041 B2 | 11/2011 | Kuboyama et al. |
| 8,156,109 B2 | 4/2012 | Kamvar et al. |
| 8,175,887 B2 | 5/2012 | Shostak |
| 8,239,206 B1 | 8/2012 | LeBeau et al. |
| 8,244,544 B1 | 8/2012 | LeBeau et al. |
| 8,260,809 B2 | 9/2012 | Platt et al. |
| 8,271,107 B2 | 9/2012 | Bodin et al. |
| 8,296,383 B2 | 10/2012 | Lindahl |
| 8,315,870 B2 | 11/2012 | Hanazawa |
| 8,326,328 B2 | 12/2012 | LeBeau et al. |
| 8,352,266 B2 | 1/2013 | Farmaner et al. |
| 8,364,481 B2 | 1/2013 | Strope et al. |
| 8,626,511 B2 | 1/2014 | LeBeau et al. |
| 8,645,393 B1* | 2/2014 | Kolak ................ G06F 17/3071 707/748 |
| 8,694,303 B2 | 4/2014 | Hopkins et al. |
| 9,152,714 B1* | 10/2015 | Dijk .................. G06F 17/30864 |
| 2001/0041980 A1 | 11/2001 | Howard et al. |
| 2002/0049805 A1 | 4/2002 | Yamada et al. |
| 2002/0128843 A1 | 9/2002 | Firman |
| 2002/0198714 A1 | 12/2002 | Zhou |
| 2003/0093419 A1 | 5/2003 | Bangalore et al. |
| 2003/0149564 A1 | 8/2003 | Gong et al. |
| 2003/0149566 A1 | 8/2003 | Levin et al. |
| 2004/0193420 A1 | 9/2004 | Kennewick et al. |
| 2004/0199375 A1 | 10/2004 | Ehsani et al. |
| 2005/0004799 A1 | 1/2005 | Lyudovyk |
| 2005/0004889 A1 | 1/2005 | Bailey et al. |
| 2005/0021826 A1 | 1/2005 | Kumar |
| 2005/0283364 A1 | 12/2005 | Longe et al. |
| 2006/0035632 A1 | 2/2006 | Sovari et al. |
| 2006/0106614 A1 | 5/2006 | Mowatt et al. |
| 2006/0129387 A1 | 6/2006 | Mitchell et al. |
| 2006/0143007 A1 | 6/2006 | Koh et al. |
| 2007/0050352 A1 | 3/2007 | Kim |
| 2007/0208567 A1 | 9/2007 | Amento et al. |
| 2007/0219798 A1 | 9/2007 | Wang et al. |
| 2008/0065617 A1 | 3/2008 | Burke et al. |
| 2008/0140647 A1* | 6/2008 | Bailey ............... G06F 17/30864 |
| 2008/0177547 A1 | 7/2008 | Yaman et al. |
| 2008/0221903 A1 | 9/2008 | Kanevsky et al. |
| 2009/0030684 A1 | 1/2009 | Cerra et al. |
| 2009/0030696 A1 | 1/2009 | Cerra |
| 2009/0094030 A1 | 4/2009 | White |
| 2009/0132529 A1* | 5/2009 | Gibbs ............... G06F 17/30887 |
| 2009/0144609 A1 | 6/2009 | Liang et al. |
| 2009/0177461 A1 | 7/2009 | Ehsani |
| 2009/0187515 A1* | 7/2009 | Andrew ............ G06F 17/3064 706/12 |
| 2009/0204410 A1 | 8/2009 | Mozer et al. |
| 2009/0240488 A1 | 9/2009 | White et al. |
| 2009/0248415 A1 | 10/2009 | Jablokov et al. |
| 2009/0248510 A1* | 10/2009 | Ahluwalia .......... G06F 17/3064 705/14.54 |
| 2009/0259646 A1* | 10/2009 | Fujita .................. G06F 17/3064 |
| 2009/0306989 A1 | 12/2009 | Kaji |
| 2009/0326936 A1 | 12/2009 | Nagashima |
| 2010/0042414 A1 | 2/2010 | Lewis et al. |
| 2010/0185446 A1 | 7/2010 | Homma et al. |
| 2010/0185448 A1 | 7/2010 | Meisel |
| 2010/0232595 A1 | 9/2010 | Bushey et al. |
| 2011/0047120 A1* | 2/2011 | Kamvar ............. G06F 17/3064 706/50 |
| 2011/0087686 A1* | 4/2011 | Brewer ............... G06F 17/3064 707/766 |
| 2011/0093488 A1* | 4/2011 | Amacker .......... G06F 17/30873 707/767 |
| 2011/0131045 A1 | 6/2011 | Cristo et al. |
| 2011/0153325 A1 | 6/2011 | Ballinger et al. |
| 2011/0161311 A1* | 6/2011 | Mishne ............... G06F 17/3064 707/719 |
| 2011/0166851 A1 | 7/2011 | LeBeau et al. |
| 2011/0166858 A1 | 7/2011 | Arun |
| 2011/0184730 A1 | 7/2011 | LeBeau et al. |
| 2011/0231191 A1 | 9/2011 | Miyazaki |
| 2011/0246944 A1 | 10/2011 | Byrne et al. |
| 2011/0289064 A1 | 11/2011 | LeBeau et al. |
| 2011/0301955 A1 | 12/2011 | Byrne et al. |
| 2012/0015674 A1 | 1/2012 | LeBeau et al. |
| 2012/0023097 A1 | 1/2012 | LeBeau et al. |
| 2012/0035932 A1 | 2/2012 | Jitkoff et al. |
| 2012/0078886 A1* | 3/2012 | Dinerstein .......... G06K 9/6255 707/723 |
| 2012/0185252 A1 | 7/2012 | Wang et al. |
| 2012/0245944 A1 | 9/2012 | Gruber et al. |
| 2012/0253799 A1 | 10/2012 | Bangalore et al. |
| 2012/0259636 A1 | 10/2012 | Sejnoha et al. |
| 2012/0259801 A1 | 10/2012 | Ji et al. |
| 2012/0271842 A1 | 10/2012 | Sun et al. |
| 2012/0310645 A1 | 12/2012 | Gruenstein et al. |
| 2013/0024195 A1 | 1/2013 | White et al. |
| 2013/0041670 A1 | 2/2013 | Morgan et al. |
| 2014/0136197 A1 | 5/2014 | Mamou et al. |

FOREIGN PATENT DOCUMENTS

| | | |
|---|---|---|
| JP | 2002-287793 | 10/2002 |
| JP | 2003-115929 | 4/2003 |

OTHER PUBLICATIONS

"Speech Recognition," Wikipedia, http://en.wikipedia.org/wiki/Speech_recognition, accessed May 29, 2013, 13 pages.

"Student's t-test," Wikipedia, https://en.wikipedia.org/wiki/Student's_t-test, accessed Jul. 8, 2013, 11 pages.

Chamiak, Eugene et al., "Coarse-to-fine n-best parsing and MaxEnt discriminative reranking," Proceedings of the 43rd Annual Meeting of the Association for Computational Linguistics (ACL) 2005, 8 pages.

Chang, Hung-An et al., "Recognizing English Queries in Mandarin Voice Search," in Proceedings of ICASSP, 2011, 4 pages.

Collins, Michael et al., "Discriminative Reranking for Natural Language Parsing," Computational Linguistics, vol. 31(1), 2005, 46 pages.

Collins, Michael et al., "Discriminative Syntactic Language Modeling for Speech Recognition," in Proceedings of ACL, 2005, 6 pages.

Della Pietra, Stephen et al., "Inducing Features of Random Fields," IEEE Transactions on Pattern Analysis and Machine Intelligence, vol. 19(4), 1997, 13 pages.

Dikici, Erinc et al., "Classification and Ranking Approaches to Discriminative Language Modeling for ASR," IEEE Transactions on Audio, Speech, and Language Processing, vol. 21(2), 2012, 10 pages.

(56) References Cited

OTHER PUBLICATIONS

Franz, Alex et al., "Searching the Web by Voice," in Proceedings 19th International Conference on Computational Linguistics (COLING), 2002, 5 pages.
Gao, Jianfeng et al., "An Empirical Study on Language Model Adaptation," ACM Trans on Asian Language Information Processing, 2006, 20 pages.
Jansen, Bernard J. et al., "Determining the User intent of web search engine queries," 16th International World Wide Web Conference (WWW 2007), 2007, 2 pages.
Jeong, Minwoo et al., "Speech Recognition Error Correction Using Maximum Entropy Language Model," in Proceedings of InterSpeech, 2004, 4 pages.
Jyothi, Preethi et al., "Large-scale Discriminative Language Model Reranking for Voice-search," in Proceedings of NAACL-HLT, 2012, 9 pages.
Kaufmann, Tobias et al., "Improving Broadcast News Transcription with a Precision Grammar and Discriminative Reranking," in Proceedings of ISCA, 2009, 4 pages.
Keshet, Joseph et al., "A Survey of Discriminative Language Modeling Approaches for Large Vocabulary Continuous Speech Recognition," Chapter 8 of Automatic Speech and Speaker Recognition: Large Margin and Kernel Methods, 2009, 21 pages.
Malouf, Robert "A Comparison of Algorithms for Maximum Entropy Parameter Estimation," in Proceedings of CONLL, 2002, 7 pages.
Mohri, Mehryar et al., "Weighted Finite-State Transducers in Speech Recognition," Computer Speech and Language, vol. 16(1), pp. 69-88, 2002, 26 pages.
Nigam, Kamal et al., "Using Maximum Entropy for Text Classification," in Proceedings of IJCAI Workshop on Machine Learning for Information Filtering, 1999, 7 pages.
Ratnaparkhi, Adwait "A Simple Introduction to Maximum Entropy Models for Natural Language Processing," Tech. Rep., Institute for Research in Cognitive Science, University of Pennsylvania, 1997, 13 pages.
Sak, Hasim et al., "Discriminative Reranking of ASR Hypotheses with Morpholexical and N-best-list Features," in Proceedings of ASRU, 2011, 6 pages.
Sak, Hasim et al., "On-the-fly Lattice Rescoring for Real-time Automatic Speech Recognition," in Proceedings of InterSpeech, 2010, 4 pages.
Schalkwyk, Johan et al., "Google Search by Voice: A case study," Advances in Speech Recognition: Mobile Environments, Call Centers and Clinics, 2010, 35 pages.
Yuan, Wei et al., "An Empirical Study on Language Model Adaptation Using a Metric of Domain Similarity," UCNLP 2006, LNAI 3651, 2005, 12 pages.
European Search Report for European Application No. EP 10 17 5449, dated Aug. 12, 2011, 3 pages.
Office Action issued in U.S. Appl. No. 12/692,307 dated Feb. 2, 2012, 32 pages.
Final Office Action issued in U.S. Appl. No. 12/692,307 dated Jul. 20, 2012, 36 pages.
Office Action in Australian Application No. 2010214793, dated Jun. 23, 2014, 3 pages.
Office Action in European Application No. 10 175 449, dated Jan. 10, 2014, 4 pages.
Office Action in Japanese Application No. 2010-199777, dated Mar. 17, 2014, 7 pages (with English translation).
Office Action in European Application No. 10 175 449, dated Aug. 25, 2011, 4 pages.
Office Action in European Application No. 10 175 449, dated Mar. 9, 2012, 4 pages.
Office Action issued in U.S. Appl. No. 12/692,307 dated May 14, 2013, 32 pages.
Notice of Allowance issued in U.S. Appl. No. 12/692,307 dated Sep. 30, 2013, 20 pages.
Office Action issued in U.S. Appl. No. 13/426,163 dated Jun. 19, 2014, 26 pages.
Office Action issued in U.S. Appl. No. 13/426,163 dated Jan. 15, 2015, 32 pages.
Office Action issued in U.S. Appl. No. 13/426,163 dated May 20, 2015, 19 pages.
Notice of Allowance issued in U.S. Appl. No. 13/426,163 dated Dec. 18, 2015, 23 pages.

\* cited by examiner

PRESENTING FORKED AUTO-COMPLETIONS

CROSS REFERENCE TO RELATED APPLICATION

This application is a continuation of U.S. application Ser. No. 13/426,163, filed Mar. 21, 2012, the contents of which are incorporated by reference herein.

BACKGROUND

This specification relates to search engines.

A search engine may receive a search query, and may search for resources on a network using the terms of the search query. The search engine may generate a search engine results page that includes multiple search results, each search result including, for example, links to resources that the search engine identifies as relevant to the query terms.

A search engine may also provide an auto-completion service. For instance, if a user begins typing characters into a search box of a search engine home page, an auto-completion engine at the search engine may provide the user with suggested query terms based on the entered characters. For example, if the user enters the characters "cof" into a search box, the auto-completion engine may provide the user with suggested query terms such as "coffee," "coffee bean," and "coffin." If the user selects a particular suggested query term, the query term is submitted to the search engine as part of a search query, as though the user had entered the entire suggested query term and submitted the search query themself.

SUMMARY

This specification describes technologies relating to search engines. To illustrate, a user who is searching for resources using a search engine may wish to restrict their search to a particular search corpus. In some implementations, a search corpus represents a categorization of resources that are related to one another—e.g., related by topic or format. For example, the user may know that he or she is searching for a news article, e.g., in the "news" corpus, or an image, e.g., in the "images" corpus, or a place on a map, e.g., in the "places" corpus, but may or may not be aware of the best query terms for satisfying their information need. When the user begins entering a query term, the user is presented with auto-completions, e.g., suggested query terms, and suggested search corpora associated with the auto-completions. Thus, the user can choose a search corpus which relates to the type of resource the user is looking for, along with the auto-completion, before the search query is submitted.

For example, if a user enters "cof," the top ranked auto-completion may be "coffee." Many users searching for coffee want to find nearby places to get a cup of coffee. However, there may be a significant portion of users who search for the history of coffee, or for images of coffee. Thus, when presenting the auto-completion, "coffee," to a particular user, the user may be presented with a "coffee" auto-completion associated with a local search corpus, a "coffee" auto-completion associated with a universal search corpus, and a "coffee" auto-completion associated with an image search corpus. Each corpus corresponds to a plurality of resources that are each relevant to that corpus, and each resource may be relevant to, and/or identified in, more than one corpus.

For example, the "places" corpus, e.g., the search corpus associated with places to buy a cup of coffee, may be the corpus most likely to be chosen by any given user searching for coffee; thus, the "coffee" auto-completion and "places" corpus may be presented to the user as a first search suggestion. A second corpus, "images," may also be presented along with the auto-completion, "coffee," as a second search suggestion—e.g., because the images corpus may be the second most likely corpus for the "coffee" query. A third corpus presented with the auto-completion, "coffee," may be the "universal" corpus. The universal corpus may be associated with some corpora, with all corpora, or with all corpora except those also presented to the user—e.g., the "universal" corpus may include all corpora except the "places" and "images" corpora. Selection of a particular auto-completion and corpus may cause submission of a query to a search engine, which may provide search results for the selected auto-completion, the search results being limited to resources related to the corpus or corpora associated with the selected auto-completion. If a resource is related to more than one corpus, it may be included in search results for each of its associated corpora.

In general, one innovative aspect of the subject matter described in this specification can be embodied in methods that include the actions of determining that an auto-completion has a strong correlation with two or more different search corpora, and providing a representation of each of the two or more corpora when presenting the auto-completion to the user. Searches conducted using the auto-completion are performed on the search corpus associated with the user-selected representation.

Another innovative aspect of the subject matter described in this specification can be embodied in methods that include the actions of receiving characters from a user device, obtaining an auto-completion that corresponds to the received characters, obtaining corpora and respective corpus scores associated with the auto-completion, selecting corpora based on the corpus scores, and providing the user device with data identifying the auto-completion and the selected corpora. Other embodiments of this aspect include corresponding systems, apparatus, and computer programs, configured to perform the actions of the methods, encoded on computer storage devices.

These and other embodiments can each optionally include one or more of the following features. The received characters may make up a partial query term, and the characters may be included in an auto-completion request that is sent by the user device. In addition, selecting corpora may comprise selecting corpora whose respective corpus scores satisfy a threshold, or selecting the n corpora that have the n highest corpus scores. Selecting corpora may comprise selecting at least one corpus whose respective corpus score satisfies a threshold and selecting a universal search corpus. Providing data identifying the auto-completion and corpora to a user device may comprise providing user interface elements corresponding to the auto-completion and each corpora, wherein selection of a corpus' user interface element causes presentation of resources that correspond to the auto-completion and the selected corpus.

Another innovative aspect of the subject matter described in this specification can be embodied in methods that include the actions of receiving characters from a user, transmitting the characters to a forking engine, receiving (i) an auto-completion that corresponds to the one or more characters, and (ii) at least first and second corpora associated with the auto-completion, each corpus corresponding to a plurality of resources that each relate to the corpus; and, displaying a representation of the auto-completion with the first and second corpora. Other embodiments of this aspect include corresponding systems, apparatus, and computer programs, configured to perform the actions of the methods, encoded on computer storage devices.

These and other embodiments can each optionally include one or more of the following features. Characters may be received through a search box, and the auto-completion and representations of the corpora may be displayed in the search box, or in a drop-down list beneath the search box.

Particular embodiments of the subject matter described in this specification can be implemented so as to realize one or more of the following advantages. A user who is searching for information and begins typing a query will be presented with auto-completions and corpora to assist the user in submitting a query for resources associated with the selected auto-completion and corpus, enhancing the user's search experience. The display of auto-completions and corpora on a user device may be configured in a manner that is easy for a user to understand and interact with. Presenting auto-completions and corpora in or with a search box is also compact, and does not require a large area for display.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
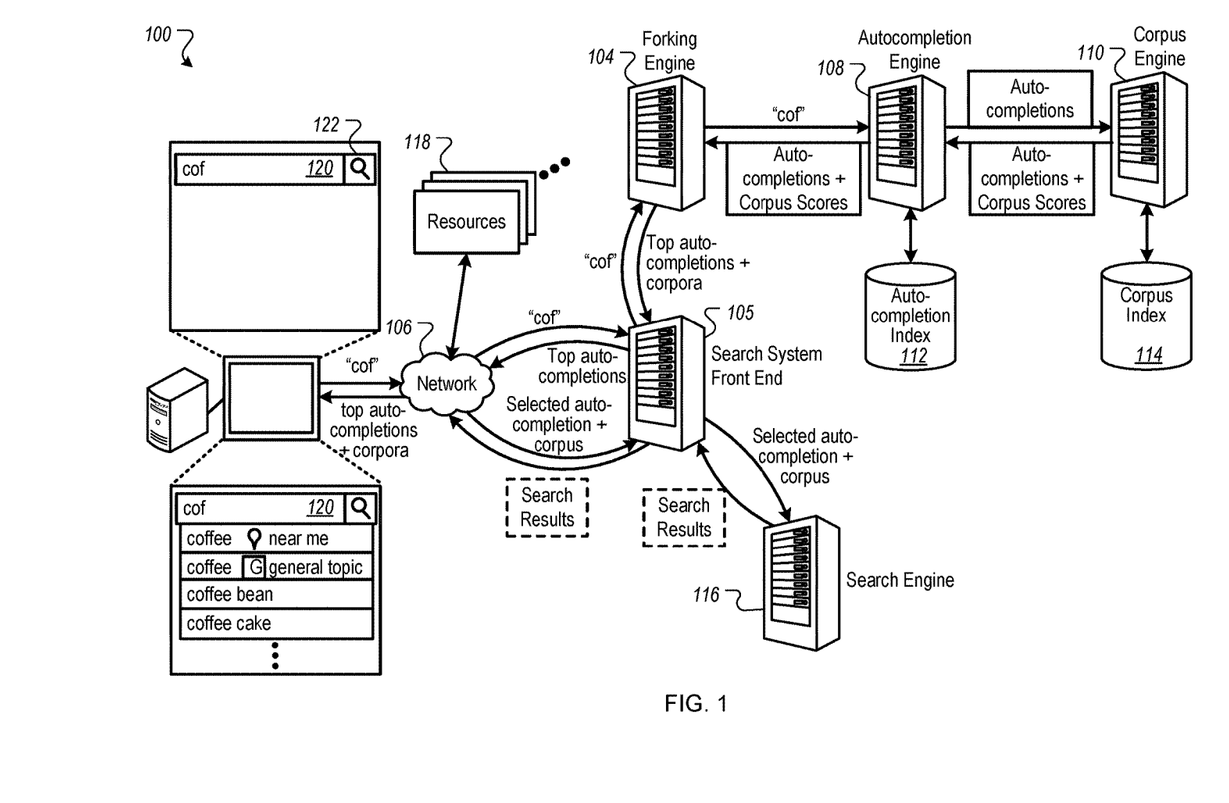
FIG. 1 is a diagram of an example environment in which forked auto-completions are presented.

FIG. 1 is a diagram of an example environment 100 in which forked auto-completions are presented. In general, the environment 100 includes a client device 102 coupled to a forking engine 104 through a search system front end 105 and over a network 106. The forking engine 104 may also be coupled to an auto-completion engine 108 and a corpus engine 110, which may be coupled, respectively, to an auto-completion index 112 and a corpus index 114. A search engine 116 may be connected to and accessible by the user device 102 through the search system front end 105 and the network 106. In addition, the example environment 100 generally includes resources 118, which are accessible by the user device 102 through the network 106.

A user device 102 is an electronic device that is owned by or otherwise under control of a user and is capable of communicating over the network 106. Example user devices 102 include personal computers, music players, tablet computers, e-book readers, mobile communication devices, and other devices that can send and receive data over the network 106. A user device 102 typically includes a user application, such as a web browser, to facilitate the sending and receiving of data, including resources 118, over the network 106. A resource 118 is any data that can be provided over the network 106. Resources include HTML pages, word processing documents, and portable document format (PDF) documents, images, video, and feed sources, to name only a few.

A user application, e.g., web browser, included in a user device 102 may facilitate searching the network 106 for resources 118 by including a search box 120 and a search button 122. In some implementations, the search box 120 and search button 122 may be provided to the user device 102 by the search system front end 105. A user may enter one or more characters into the search box 120 and interact with the search button 122 to initiate a search for resources—e.g., using a search engine 116. Before interacting with the search button 122 or the search engine 116, a user may enter one or more characters into the user device 102, e.g., using the search box 120, which may be sent by the user device 102 to the forking engine 104 through the network 106 and search system front end 105.

The forking engine 104 receives one or more characters from a user device 102. In some implementations, the one or more characters make up a partial query term. For example, a user may enter the characters "cof" in a search box 120 as the beginning characters for a search query—e.g., the user may be searching for "coffee," "coffee beans," or "coffins". The characters, "cof," may be sent by the user device 102 to the forking engine 104 before the user finishes typing the query, and without interaction with the search button 122.

The forking engine 104 obtains an auto-completion corresponding to the one or more characters. In some implementations, the auto-completion represents a suggested search term. For example, the forking engine 104 may provide the auto-completion engine 108 with the characters, "cof." The auto-completion engine 108 may then search the auto-completion index 112 to identify an auto-completion based on the characters, "cof," for presentation as a suggested search term. The auto-completion engine 108 may identify the most relevant or popular auto-completion, e.g., based on the search term most often submitted as a query given the first characters, "cof", but many suitable methods for determining an auto-completion exist. Example auto-completions for the characters, "cof," include "coffee," "coffee bean," "coffee shop," and "coffin." The auto-completion obtained by the forking engine 104 may be the most popular auto-completion for the given one or more characters—e.g., "coffee".

The forking engine 104 obtains data identifying two or more corpora and a respective corpus score associated with the auto-completion for each identified corpus. For example, the corpus engine 110 may receive the auto-completion, "coffee," and search the corpus index 114 to identify at least two corpora for "coffee" and corpus scores for each identified corpus. A corpus score generally represents a measure of confidence that the respective corpus will be chosen by a user when presented with the auto-completion. Each corpus score may be measured on a scale, for example, 1 to 100, where 1 indicates the lowest measure of confidence and 100 indicates the highest level of confidence, or a probabilistic scale of confidence using a range of 0.0 to 1.0; many suitable score scales exist for representing confidence.

In some implementations, the corpus score may be based on metrics associated with the auto-completion. For example, the corpus engine 110 may generate a corpus score for "coffee" based on a click-through rate, e.g., the rate at which a resource is selected in response to a query, associated with the resources provided in response to the query, "coffee." Consider an example wherein resources belonging to the "places" corpus are selected for 75% of "coffee" queries, resources belonging to the "images" corpus are selected for 15% of "coffee" queries, and resources belonging to the "news" corpus are selected for 5% of "coffee" queries. An example set of corpora and respective corpus scores for "coffee" (using a probabilistic scale of confidence, based on click-through rate, using a range of 0.0 to 1.0) may be as follows: {places: 0.75, images: 0.15, news: 0.05 . . . }. Any appropriate metric or combination of metrics may be used as a basis for calculating the corpus score, such as click length or general traffic for resources provided in response to a query.

In some implementations, if a resource belonging to multiple corpora is selected when presented in response to a query, the corpus score for one or more of the multiple corpora may be affected. For example, if a user who searches for "coffee" selects a result that is in both the "news" and "blog" corpora, corpus scores for both corpora—or only the more popular corpus—may be increased. In some implementations, user-specific metrics may be used to calculate corpus scores. For example, if a user searching for "coffee" selects results from the "places" corpus for 100% of the user's "coffee" searches, the corpus score for "coffee"—for that particular user—may be 1.0.

An example set of corpora and respective corpus scores for "coffee" (using a scale of 1 to 100) may be as follows: {places: 80, images: 35, news: 15, universal: 5 . . . }. The foregoing example set indicates that, when a user searches for "coffee," there is a high confidence that the user is likely to search for "coffee" in the "places" corpus—e.g., the user wants to find a place that sells coffee. There is a somewhat low confidence that the user is likely to search the "images" corpus for "coffee," there is a low confidence that the user is likely to search for "coffee" in the "news" corpus, and a very low confidence that the user is likely to search for "coffee" in the "universal" corpus.

The forking engine 104 selects two or more of the corpora based on the respective corpus scores. In some implementations, the forking engine 104 selects at least one corpus whose respective corpus score satisfies a threshold, and the forking engine 104 also selects the "universal" corpus. In the above example, if the threshold is 50, the "places" corpus would be selected along with the "universal" corpus. If the threshold was 30, the "places" and "images" corpora may be selected along with the "universal" corpus. In some implementations, a predetermined number of corpora may be selected. For example, if four corpora are identified, and each of the four have respective corpus scores that satisfy the corpus score threshold, the forking engine 104 may nevertheless only select two of the four corpora.

The forking engine 104 provides data that identifies the auto-completion and the selected corpora to the user device 102. In some implementations, providing data that identifies the auto-completion and the selected corpora to the user device 102 includes providing a respective visual representation associated with each of the selected corpora. For example, if the auto-completion is "coffee," and if the selected corpora are the "places" and "universal" corpora, the forking engine 104 may "fork" the auto-completion, and cause the user device 102 to display "coffee" below the search box 120 one time for each corpus. On one side of the auto-completion fork, a "coffee" auto-completion may be accompanied by text or an icon that represents the "places" corpus, while another side of the auto-completion fork may display the "coffee" auto-completion accompanied by text or an icon that represents the "universal" corpus.

When a user selects one of the displayed auto-completions and corpora, the user device 102 may send a query to the search engine 116 through the search system front and 105 and the network 106. The query may include the user selected auto-completion and corpus. When the search engine 116 receives the query, the search engine 116 may search for resources in the selected corpus which are most relevant to the selected auto-completion. Each resource included in the selected corpus relates to that selected corpus—e.g., resources included in the "images" corpus relate to images, and are likely to include, or consist of, images. For example, if a user selects the "coffee" auto-completion with the "places" corpora, the user device 102 sends this information to the search engine 116, which searches the places corpus for resources relevant to "coffee"—e.g., searches a map of a location close to the location of the user device 102 for places related to "coffee".

Figure 2:
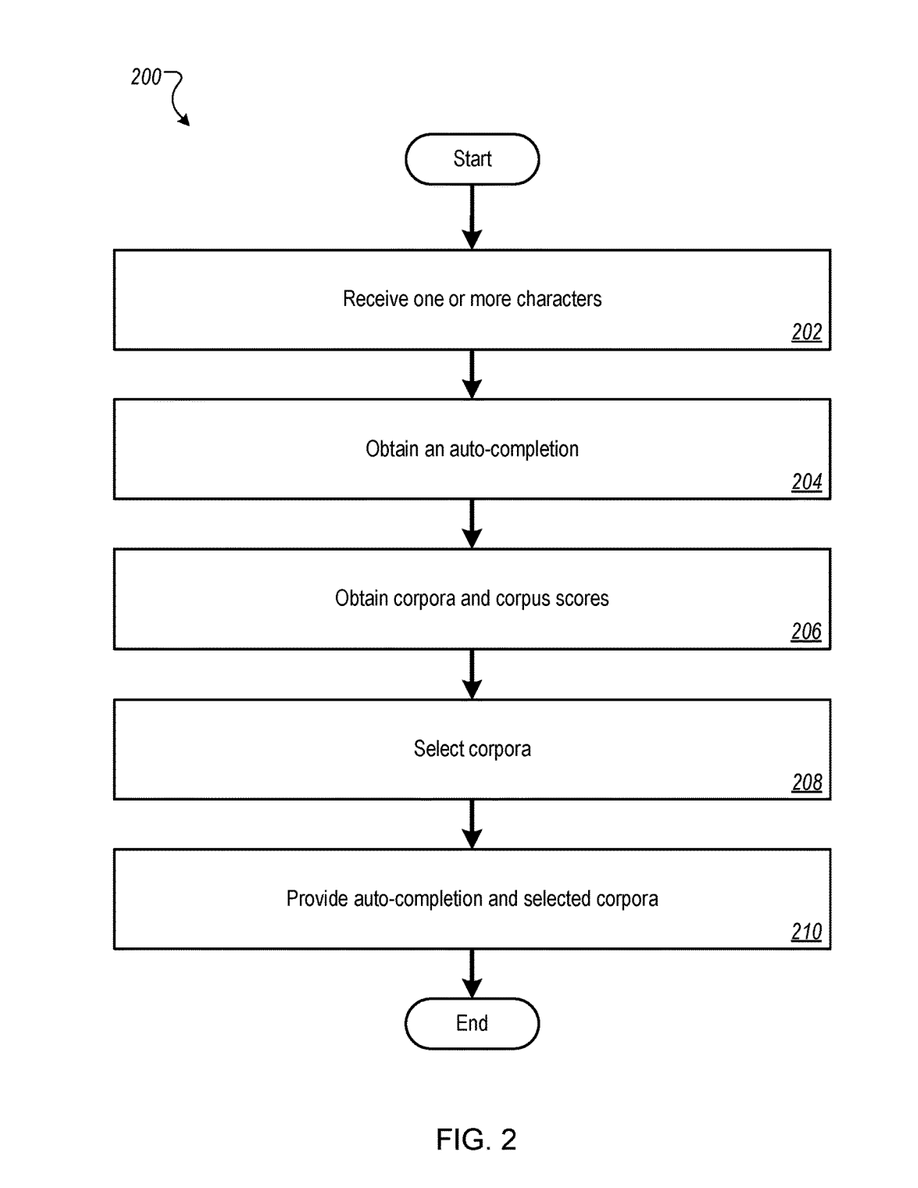
FIG. 2 is a flow chart of an example process for providing forked auto-completions.

FIG. 2 is a flow chart of an example process 200 for providing forked auto-completions. The process 200 may be used by a data processing apparatus that is used to realize the forking engine 104. In particular, process 200 is used to provide auto-completions and corpora to a user device.

One or more characters are received from a user device (202). The forking engine 104 generally receives the characters through the network 106. In some implementations, the one or more characters are included in an auto-completion request which was sent to the forking engine 104 by the user device 102. For example, a user may enter "bas" in search box of a user device, and the user device may transmit those three characters to the forking engine 104 as part of a request to provide an auto-completion.

An auto-completion corresponding to the one or more characters is obtained (204). In some implementations, the one or more characters are provided to an auto-completion engine 108, which obtains an auto-completion for the one or more characters from an auto-completion index. For example, if an auto-completion engine is provided with "bas," it may query an auto-completion index, which may include auto-completions, e.g., suggested search terms, based on "bas."

There may be multiple auto-completions for "bas," and they may be ranked in the auto-completion index—e.g., ranked by a user selection rate which represents the rate at which a particular auto-completion is selected when presented in response to an auto-completion request. Example auto-completions for "bas" may include "baseball," "baseball bat," "bass," and "basket." More than one auto-completion may be obtained, and the auto-completion(s) may be obtained based on rank.

Data identifying two or more corpora and a respective corpus score associated with the auto-completion for each identified corpus is obtained (206). In some implementations, an auto-completion is provided to the corpus engine 110, which obtains corpus data for the auto-completion from a corpus index. The corpus data may identify two or more corpora and respective corpus scores associated with the auto-completion.

For example, the corpus engine may query the corpus index using the auto-completion, "baseball." The corpus index may reference the following set of corpora and their respective corpus scores for "baseball" (on a scale from 1 to 100): {places: 7, images: 39, videos: 31, news: 91, shopping: 44, literature: 19, blogs: 10, patents: 4, universal: 29}. The corpus engine may then obtain, from the corpus index, the foregoing set of corpora and corpus scores for "baseball."

Two or more of the corpora are selected based on the respective corpus scores (208). In some implementations, the forking engine 104 selects the top n corpora with the top n corpus scores. Given the example set above, and where n=3, the chosen corpora would be "news," "shopping," and "images" (corpus scores of 91, 44 and 39, respectively). In some implementations, the forking engine selects at least one corpus having a corpus score which satisfies a corpus score threshold. For example, given a corpus score threshold of 40, the "news" and "shopping" corpora in the above example would be selected.

In some implementations, the forking engine selects at least one corpus having a corpus score which satisfies a threshold, and also selects a particular corpus. This would ensure that a particular corpus is always selected, even if it does not meet the corpus score threshold. In some contexts it may be desirable to always select a particular corpus—e.g., if a particular user often searches for news, the "news" corpus may always be selected for that particular user, regardless of the corpus score. In some implementations, the particular corpus is selected for a user based on past user interaction, such as the user's selection of that particular corpus more often than any other corpus, or based on the user's selection of that particular corpus a threshold percent of the times the user is provided with the corpora choices. In some implementations, the particular corpus may be selected based on explicit user preference provided by the user. Given the above example corpus scores for "news," "shopping," and "images" (corpus scores of 91, 44 and 39, respectively), an example corpus score threshold of 80, and the particular corpus, "universal," the "news" and "universal" corpora would be selected by the forking engine.

Data that identifies the auto-completion and the selected corpora to the user device is provided (210). The forking engine 104 provides the data to the user device 102 across the network 106. In some implementations, the provided data causes presentation of a plurality of user interface elements on the user device, and at least two user interface elements correspond to the auto-completion and the selected corpora. For example, the data may cause a user device to present one or more auto-completions for "bas"—e.g., "baseball," "baseball bat," "bass," "basket"- to a user, along with the respective corpora for one or more of those auto-completions—e.g., "baseball: news," and "baseball: universal". Presentation of user interface elements is more particularly described with reference to FIG. 3 through FIG. 7 below.

In some implementations, selection of one of the user interface elements causes presentation of at least one resource corresponding to the auto-completion and the corpus to which the selected user interface element corresponds. For example, if a user selects the user interface element corresponding to "baseball: news," a query for "baseball" in the "news" corpus may be transmitted to the search engine 116, which may return, as search results, data identifying news articles associated with "baseball."

Figure 3:
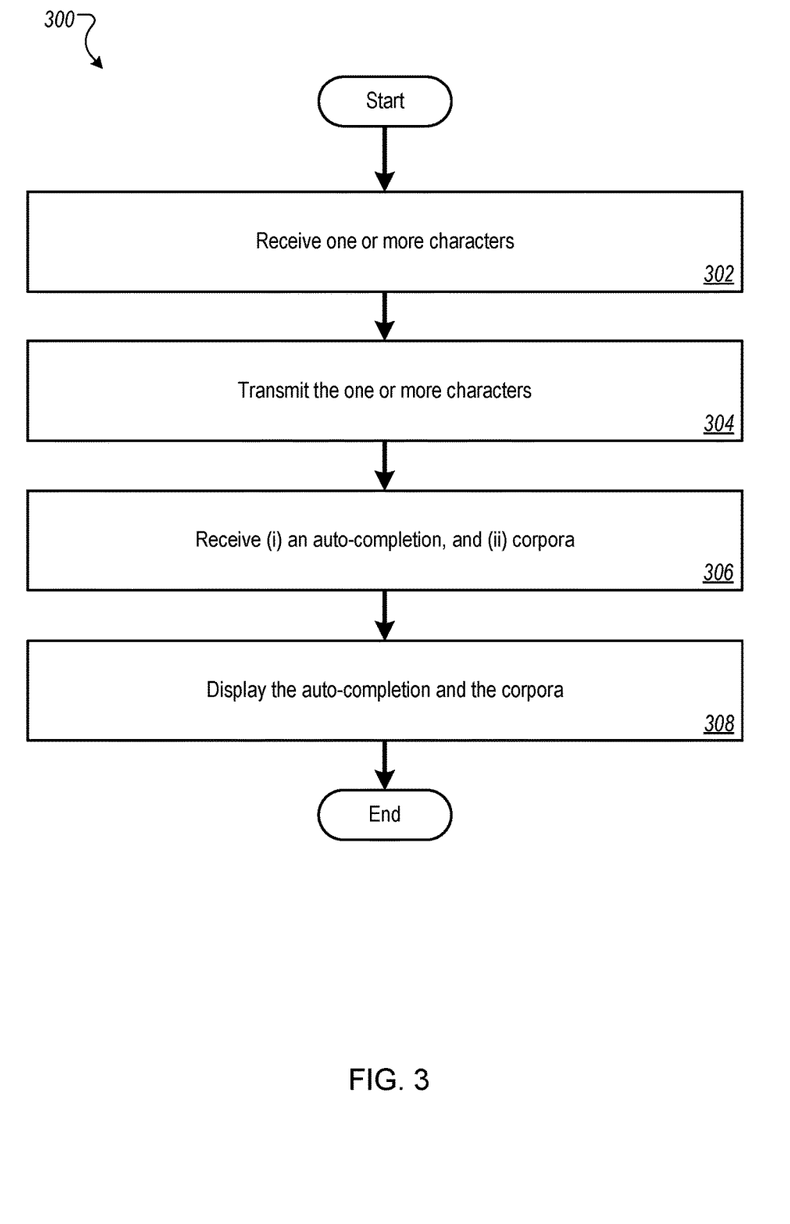
FIG. 3 is a flow chart of an example process for receiving forked auto-completions.

FIG. 3 is a flow chart of an example process for receiving forked auto-completions. The process 300 may be used by a data processing apparatus that is used to realize the user device 102. In particular, process 200 is used to display forked auto-completions on a user device 102.

One or more characters are received from a user (302). In some implementations, the characters are received through a search box 122 of a user application included in a user device 102. For example, the user might enter the characters, "cof," into the search box of a web browser included in a mobile device.

The one or more characters are transmitted to a forking engine (304). The one or more characters may be transmitted by way of an auto-completion request sent by the user device 102 across the network 106. In some implementations, the transmission of the auto-completion request may be performed without the user's interaction with a search button 122.

Data identifying (i) an auto-completion that corresponds to the one or more characters, and (ii) at least first and second corpora associated with the auto-completion is received (306). The data may be received at the user device 102 from the forking engine 104 across the network 106. For example, the user device may receive data indicating the auto-completion, "coffee," and the corpora, "places" and "universal." The received data may also include other auto-completions for "cof" and associated corpora.

A representation of the auto-completion and the first corpus, and a representation of the auto-completion and the second corpus are displayed (308). Each representation is displayed on the user device 102. Example representations include, but are not limited to, text, icons, buttons and other visual representations which indicate the auto-completion and corpus to a user. In some implementations, each representation is displayed in a drop-down list beneath the search box. Example implementations for displaying the representations are discussed below with reference to FIG. 4 through FIG. 7.

Figure 4:
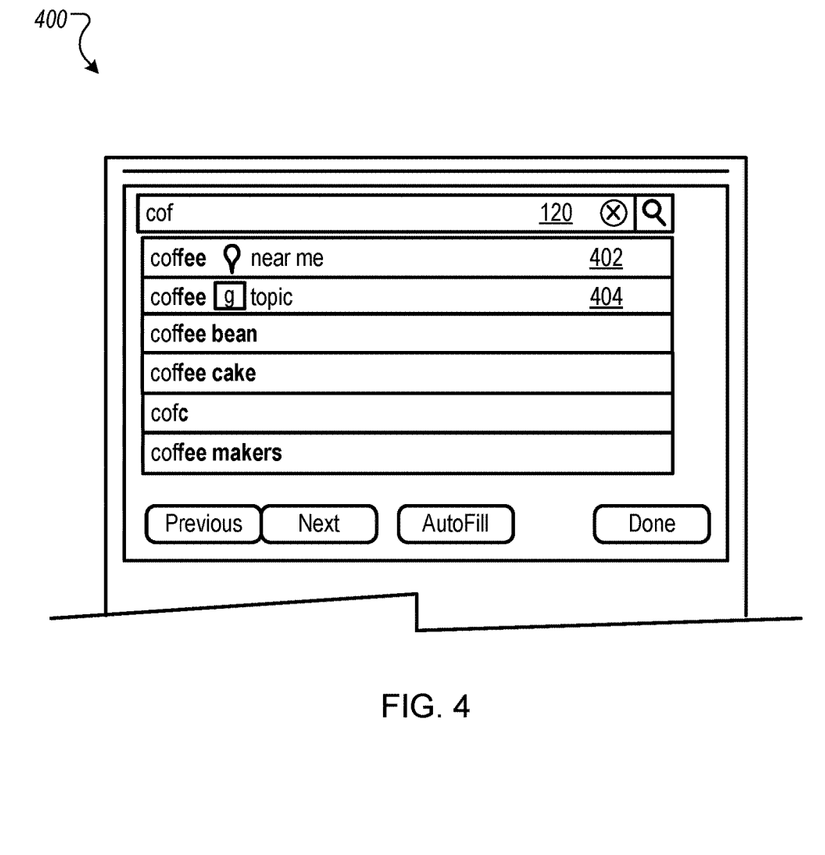
FIG. 4 is an example display of forked auto-completions.

FIG. 4 is an example display of forked auto-completions. The display may be shown on a user device 102 upon receiving data identifying an auto-completion and at least first and second corpora associated with the auto-completion. In this example, the representations are displayed in a drop-down list beneath the search box 120. The first row 402 of the drop-down list is a display of the auto-completion, "coffee," and the first corpus, "places" (depicted by the icon and text, "near me"). The second row 404 of the drop-down list is a display of the auto-completion, "coffee," and the second corpus, "universal" (depicted by the icon and text, "topic"). In this example, other auto-completions for "cof," without associated corpora, are also displayed in the drop-down list—e.g., "coffee bean," "coffee shop," etc.

Figure 5:
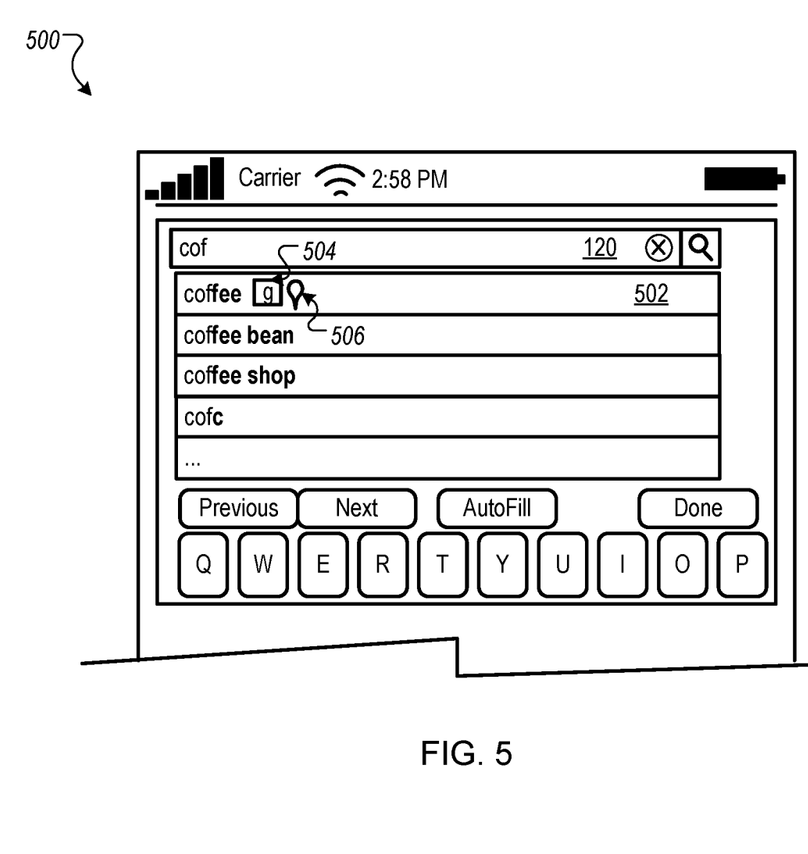
FIG. 5 is an example display of forked auto-completions.

FIG. 5 is an example display of forked auto-completions. The display may be shown on a user device 102 upon receiving data identifying an auto-completion and at least first and second corpora associated with the auto-completion. In this example, the representations are displayed in a drop-down list beneath the search box 120. The first row 502 of the drop-down list is a display of the auto-completion, "coffee," the second corpus, "universal" (depicted by the first icon 504), and the first corpus, "places" (depicted by the second icon 506). In this example, other auto-completions for "cof," without associated corpora, are also displayed in the drop-down list—e.g., "coffee bean," "coffee shop," etc.

Figure 6:
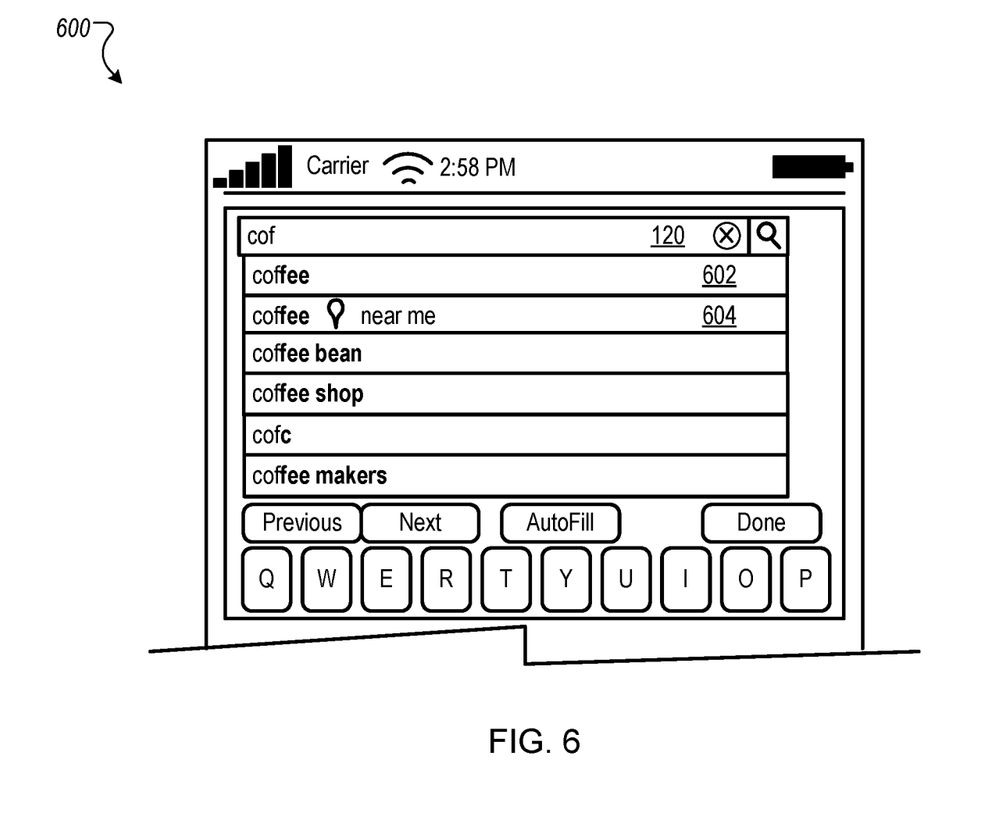
FIG. 6 is an example display of forked auto-completions.

FIG. 6 is an example display of forked auto-completions. The display may be shown on a user device 102 upon receiving data identifying an auto-completion and at least first and second corpora associated with the auto-completion. In this example, the representations are displayed in a drop-down list beneath the search box 120. The first row 602 of the drop-down list is a display of the auto-completion, "coffee," and the second corpus, "universal" (depicted by the auto-completion only). The second row 604 of the drop-down list is a display of the auto-completion, "coffee,"

and the first corpus, "places" (depicted by the icon and text, "near me"). In this example, other auto-completions for "cof," without associated corpora, are also displayed in the drop-down list—e.g., "coffee bean," "coffee shop," etc.

Figure 7:
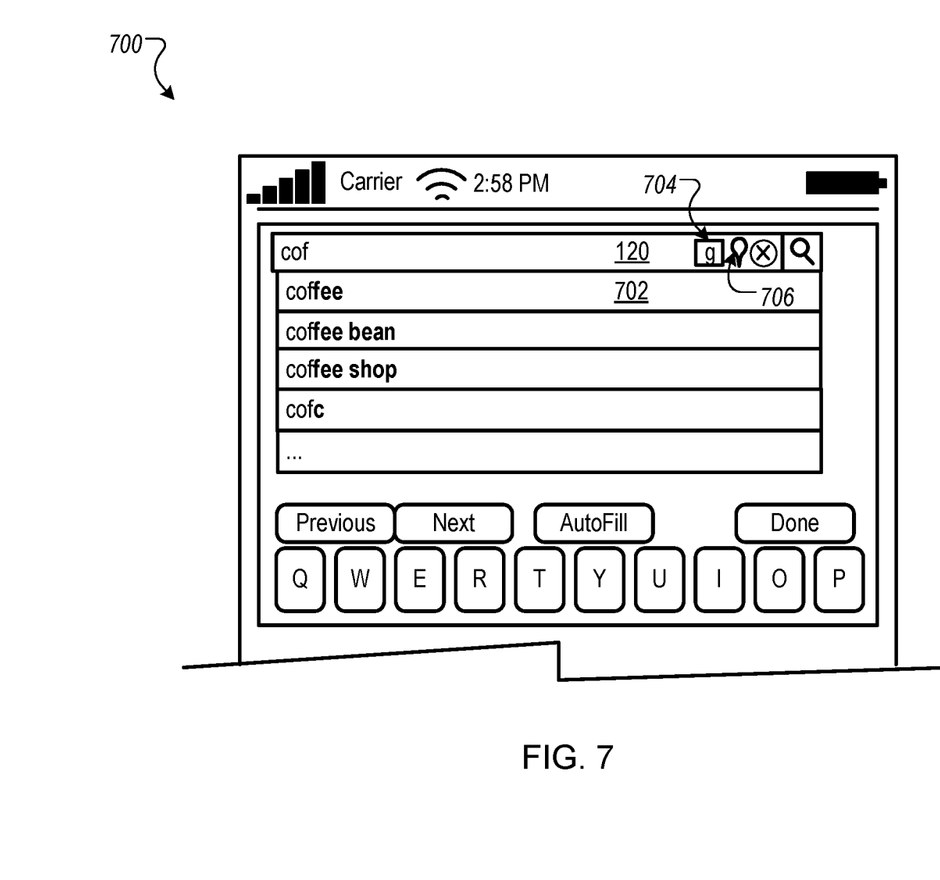
FIG. 7 is an example display of forked auto-completions.

FIG. 7 is an example display of forked auto-completions. The display may be shown on a user device 102 upon receiving data identifying an auto-completion and at least first and second corpora associated with the auto-completion. In this example, the representations are displayed in the search box 120 and a drop-down list beneath the search box. The first row 702 of the drop-down list is a display of the auto-completion, "coffee." The representations of the corpora are displayed as icons in the search box. The second corpus, "universal," is depicted by the first icon 704, and the first corpus, "places," is depicted by the second icon 706. In this example, other auto-completions for "cof," without associated corpora, are also displayed in the drop-down list—e.g., "coffee bean," "coffee shop," etc.

Figure 8:
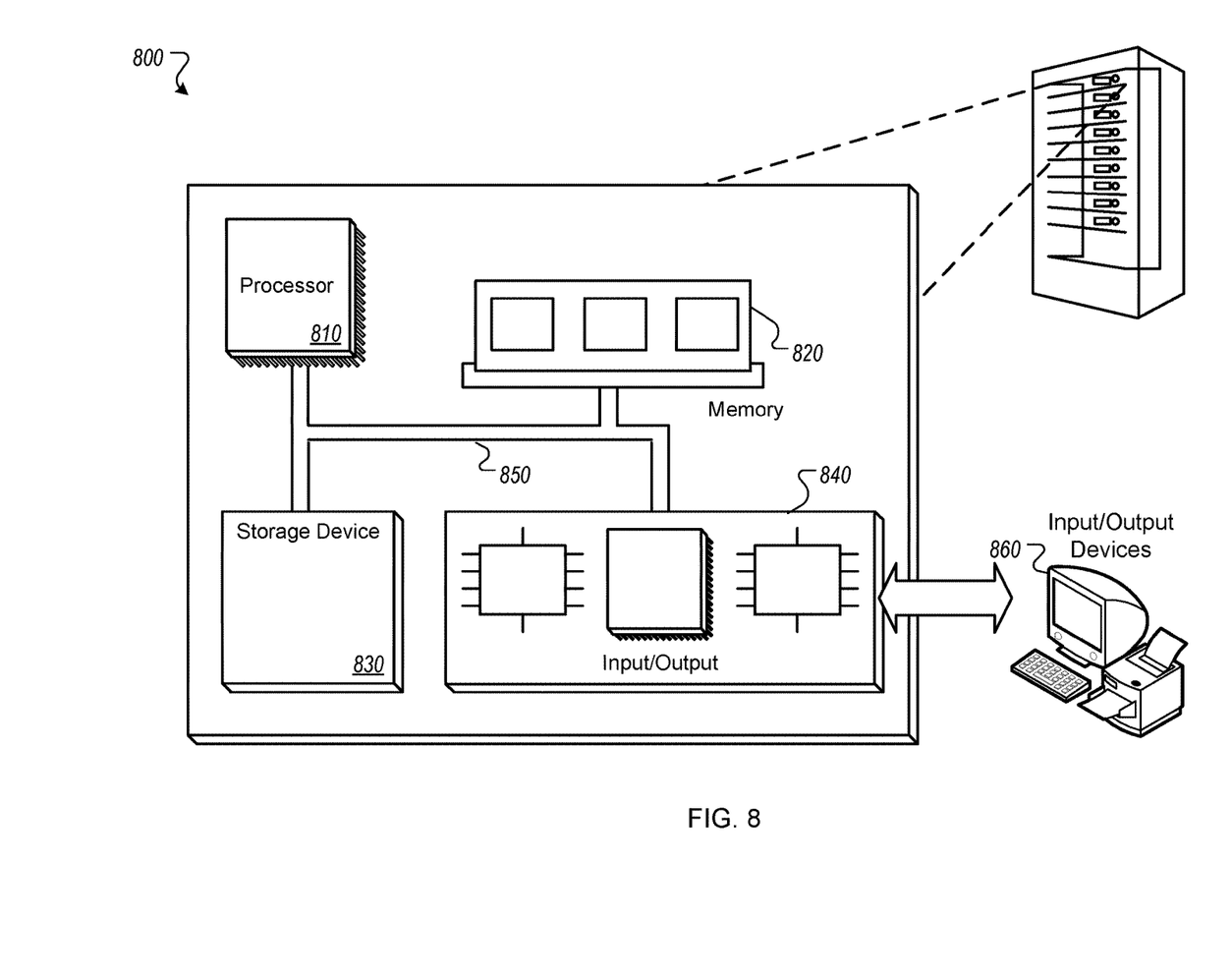
FIG. 8 is a block diagram of an example data processing apparatus.

FIG. 8 is a block diagram of an example data processing apparatus 800 that can be used to perform operations described above. The apparatus 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the apparatus 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the apparatus 800. In one implementation, the storage device 830 is a computer-readable medium. In various different implementations, the storage device 830 can include, for example, a hard disk device, an optical disk device, a storage device that is shared over a network by multiple computing devices, e.g., a cloud storage device, or some other large capacity storage device.

The input/output device 840 provides input/output operations for the apparatus 800. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although an example data processing apparatus has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media—e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files—e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device—e.g., a universal serial bus (USB) flash drive—to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network—e.g., the Internet—and peer-to-peer networks—e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device—e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, from a user device, a query entered using a user interface displayed on the user device;
   in response to receiving the query, obtaining a first corpus score of a first search corpus and a second corpus score of a second search corpus;
   determining that the first corpus score of the first search corpus satisfies a threshold and that the second corpus score of the second search corpus satisfies the threshold;
   based on determining that the first corpus score of the first search corpus satisfies the threshold and that the second corpus score of the second search corpus satisfies the threshold, providing, to the user device, a response configured to cause the user device to present, on the user interface, (i) a first autocompletion user interface element that includes autocompletion text and a first corpus identifier that identifies a first search corpus, (ii) a second autocompletion user interface element that includes the autocompletion text and a second corpus identifier that identifies a second search corpus, and (iii) a third autocompletion user interface element that includes the autocompletion text and corresponds to a third search corpus that includes the first search corpus and the second search corpus;

receiving, from the user device, data indicating a user selection of the first autocompletion user interface element;

searching for resources in the first search corpus using the auto completion text as a search query, wherein the searching is restricted to the first search corpus; and providing, in response to receiving the data indicating the user selection of the first autocompletion user interface element, search results from the first search corpus identified by the searching.

2. The method of claim 1, wherein:
the first corpus score is based on a first measure of confidence that the user will select the first autocompletion user interface element, and
the second corpus score is based on a second measure of confidence that the user will select the second autocompletion user interface element.

3. The method of claim 1, wherein:
the first corpus score is based on previous selection rates of user interface elements that include the autocompletion text and that correspond to the first search corpus, and
the second corpus score is based on previous selection rates of user interface elements that include the auto completion text and that correspond to the second search corpus.

4. The method of claim 1, wherein the response is further configured to cause the user device to present, on the user interface, the first autocompletion user interface element, the second autocompletion user interface element, and the third autocompletion user interface element in a drop-down menu.

5. The method of claim 1, wherein the response is further configured cause the user device to present, on the user interface, (i) the first autocompletion user interface element that includes the autocompletion text in line with the first corpus identifier, and (ii) the second autocompletion user interface element that includes the autocompletion text in line with the second corpus identifier.

6. The method of claim 1, comprising:
obtaining a corpus score for each of multiple search corpora; and
determining that, of the multiple search corpora, only the first corpus score of the first search corpus and the second corpus score of the second search corpus satisfy the threshold,
wherein the response is configured to cause the user device to present, on the user interface, the third autocompletion user interface element that includes the autocompletion text and corresponds to the third search corpus that includes the first search corpus and the second search corpus based on determining that only the first corpus score of the first search corpus and the second corpus score of the second search corpus are associated with corpus scores that satisfy the threshold.

7. A system comprising:
one or more computers and one or more storage devices storing instructions that are operable, when executed by the one or more computers, to cause the one or more computers to perform operations comprising:
receiving, from a user device, a query entered using a user interface displayed on the user device;
in response to receiving the query, obtaining a first corpus score of a first search corpus and a second corpus score of a second search corpus;
determining that the first corpus score of the first search corpus satisfies a threshold and that the second corpus score of the second search corpus satisfies the threshold;
based on determining that the first corpus score of the first search corpus satisfies the threshold and that the second corpus score of the second search corpus satisfies the threshold, providing, to the user device, a response configured to cause the user device to present, on the user interface, (i) a first autocompletion user interface element that includes autocompletion text and a first corpus identifier that identifies a first search corpus, (ii) a second autocompletion user interface element that includes the autocompletion text and a second corpus identifier that identifies a second search corpus, and (iii) a third autocompletion user interface element that includes the auto-completion text and corresponds to a third search corpus that includes the first search corpus and the second search corpus;
receiving, from the user device, data indicating a user selection of the first autocompletion user interface element;
searching for resources in the first search corpus using the auto completion text as a search query, wherein the searching is restricted to the first search corpus; and
providing, in response to receiving the data indicating the user selection of the first autocompletion user interface element, search results from the first search corpus identified by the searching.

8. The system of claim 7, wherein:
the first corpus score is based on a first measure of confidence that the user will select the first autocompletion user interface element, and
the second corpus score is based on a second measure of confidence that the user will select the second autocompletion user interface element.

9. The system of claim 7, wherein:
the first corpus score is based on previous selection rates of user interface elements that include the autocompletion text and that correspond to the first search corpus, and
the second corpus score is based on previous selection rates of user interface elements that include the auto completion text and that correspond to the second search corpus.

10. The system of claim 7, wherein the response is further configured to cause the user device to present, on the user interface, the first autocompletion user interface element, the second autocompletion user interface element, and the third autocompletion user interface element in a drop-down menu.

11. The system of claim 7, wherein the response is further configured cause the user device to present, on the user interface, (i) the first autocompletion user interface element that includes the autocompletion text in line with the first corpus identifier, and (ii) the second autocompletion user interface element that includes the autocompletion text in line with the second corpus identifier.

12. The system of claim 7, wherein the operations further comprise:
   obtaining a corpus score for each of multiple search corpora; and
   determining that, of the multiple search corpora, only the first corpus score of the first search corpus and the second corpus score of the second search corpus satisfy the threshold,
   wherein the response is configured to cause the user device to present, on the user interface, the third autocompletion user interface element that includes the autocompletion text and corresponds to the third search corpus that includes the first search corpus and the second search corpus based on determining that only the first corpus score of the first search corpus and the second corpus score of the second search corpus are associated with corpus scores that satisfy the threshold.

13. A non-transitory computer-readable medium storing software comprising instructions executable by one or more computers which, upon such execution, cause the one or more computers to perform operations comprising:
   receiving, from a user device, a query entered using a user interface displayed on the user device;
   in response to receiving the query, obtaining a first corpus score of a first search corpus and a second corpus score of a second search corpus;
   determining that the first corpus score of the first search corpus satisfies a threshold and that the second corpus score of the second search corpus satisfies the threshold;
   based on determining that the first corpus score of the first search corpus satisfies the threshold and that the second corpus score of the second search corpus satisfies the threshold, providing, to the user device, a response configured to cause the user device to present, on the user interface, (i) a first autocompletion user interface element that includes autocompletion text and a first corpus identifier that identifies a first search corpus, (ii) a second autocompletion user interface element that includes the autocompletion text and a second corpus identifier that identifies a second search corpus, and (iii) a third autocompletion user interface element that includes the autocompletion text and corresponds to a third search corpus that includes the first search corpus and the second search corpus;
   receiving, from the user device, data indicating a user selection of the first autocompletion user interface element;
   searching for resources in the first search corpus using the auto completion text as a search query, wherein the searching is restricted to the first search corpus; and
   providing, in response to receiving the data indicating the user selection of the first autocompletion user interface element, search results from the first search corpus identified by the searching.

14. The method of claim 1, wherein:
   the first autocompletion user interface element includes the autocompletion text without including additional text,
   the second autocompletion user interface element includes the autocompletion text without including additional text, and
   the third autocompletion user interface element includes the autocompletion text without including additional text.

15. The method of claim 1, wherein the third search corpus includes the first search corpus, the second search corpus, and additional search corpora.

16. The medium of claim 13, wherein:
   the first corpus score is based on a first measure of confidence that the user will select the first autocompletion user interface element, and
   the second corpus score is based on a second measure of confidence that the user will select the second autocompletion user interface element.

17. The medium of claim 13, wherein:
   the first corpus score is based on previous selection rates of user interface elements that include the autocompletion text and that correspond to the first search corpus, and
   the second corpus score is based on previous selection rates of user interface elements that include the auto completion text and that correspond to the second search corpus.

18. The medium of claim 13, wherein the response is further configured to cause the user device to present, on the user interface, the first autocompletion user interface element, the second autocompletion user interface element, and the third autocompletion user interface element in a drop-down menu.

19. The medium of claim 13, wherein the response is further configured cause the user device to present, on the user interface, (i) the first autocompletion user interface element that includes the autocompletion text in line with the first corpus identifier, and (ii) the second autocompletion user interface element that includes the autocompletion text in line with the second corpus identifier.

20. The medium of claim 13, wherein the operations further comprise:
   obtaining a corpus score for each of multiple search corpora; and
   determining that, of the multiple search corpora, only the first corpus score of the first search corpus and the second corpus score of the second search corpus satisfy the threshold,
   wherein the response is configured to cause the user device to present, on the user interface, the third autocompletion user interface element that includes the autocompletion text and corresponds to the third search corpus that includes the first search corpus and the second search corpus based on determining that only the first corpus score of the first search corpus and the second corpus score of the second search corpus are associated with corpus scores that satisfy the threshold.

* * * * *

UNITED STATES PATENT AND TRADEMARK OFFICE
CERTIFICATE OF CORRECTION

PATENT NO. : 10,210,242 B1
APPLICATION NO. : 15/088306
DATED : February 19, 2019
INVENTOR(S) : Zivkovic et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 348 days.

Signed and Sealed this
Thirteenth Day of December, 2022

*Katherine Kelly Vidal*

Katherine Kelly Vidal
*Director of the United States Patent and Trademark Office*